United States Patent [19]

Asher et al.

[11] 3,981,839

[45] Sept. 21, 1976

[54] PROCESS FOR THE PREPARATION OF POLYMER DISPERSIONS

[75] Inventors: Brian Roy Asher, Egham; Morice William Thompson, Maidenhead, both of England

[73] Assignee: Imperial Chemical Industries Limited, London, England

[22] Filed: June 12, 1974

[21] Appl. No.: 478,831

[30] Foreign Application Priority Data

June 18, 1973 United Kingdom............... 28837/73

[52] U.S. Cl. ..................... 260/33.6 R; 260/33.8 R; 260/34.2; 260/857 UN; 260/873
[51] Int. Cl.² ...................... C08J 3/02; C08K 5/01; C08K 5/02; C08K 5/05
[58] Field of Search .................. 260/33.6 R, 33.8 R, 260/34.2

[56] References Cited

UNITED STATES PATENTS

| | | | |
|---|---|---|---|
| 3,383,352 | 5/1968 | Duell et al. ..................... | 260/33.6 R |
| 3,532,663 | 10/1970 | Nicks et al. ......................... | 260/34.2 |
| 3,580,880 | 5/1971 | Clarke et al. .................. | 260/33.6 R |
| 3,679,612 | 7/1972 | Titow ............................. | 260/33.8 R |

*Primary Examiner*—Allan Lieberman
*Attorney, Agent, or Firm*—Cushman, Darby & Cushman

[57] ABSTRACT

A process is described for the preparation of a dispersion of a condensation polymer in a hydrocarbon or chlorinated hydrocarbon liquid in which the polymer is insoluble, employing one or more polymer-forming reactants which are also insoluble in that liquid. Such a reactant is dissolved in a second liquid which is inert to the polymer-forming reaction, is immiscible with the first liquid at the reaction temperature and can be separated from the latter by distillation, and the solution of the reactant is emulsified in the first liquid, prior to heating the reaction mixture to form the polymer, with the aid of a specified emulsifying agent.

10 Claims, No Drawings

PROCESS FOR THE PREPARATION OF POLYMER DISPERSIONS

This invention relates to a process for the preparation of polymers in an organic liquid medium and especially to dispersions of condensation polymers as hereinafter defined formed from at least one reactant which is insoluble in the liquid medium.

By "condensation polymers" we mean polymers in which the links between the reactants which form the polymer involve atoms other than carbon and in which a low-molecular weight by-product is eliminated during the polymerisation reaction. Such polymers include, for example, polyesters and polyamides.

In Osborn et al. application, Ser. No. 237,522, filed Mar. 23, 1972, now abandoned in favor of continuation application, Ser. No. 439,640, filed Feb. 4, 1974 we have described and claimed a process for the preparation of a dispersion of a condensation polymer as hereinabove defined in a liquid medium in which the polymer is insoluble, that is to say, is sufficiently immiscible with the liquid medium to form a separate phase, which comprises heating in the liquid medium at a temperature of at least 150°C. an appropriate polymer-forming reactant or reactants, the reactant or at least one of the reactants being insoluble in the liquid medium and being present as a liquid disperse phase in an emulsion of specified type. The emulsion is defined in the said Application as being of the type which is described and claimed in our British Pat. No. 1,211,532, namely an emulsion in which the emulsifying agent is a polymeric material containing in its molecule at least one chain-like component of a type which is soluble and non-self-associated in the liquid of the disperse phase and at least one chain-like component of another type which is soluble and non-self-associated in the liquid of the continuous phase, the average molecular weight of the individual components being at least 1,000, the total molecular weight of the individual components of each type being at least 3,000 or at least $n \times 1,000$, where $n$ is the number of the individual components of the other type, whichever is the higher, and the ratio of the total weights of the individual components of the two types being from 3:1 to 1:3. The process of application Ser. No. 237,522 further requires that one of the chain-like components of an emulsifying agent present which is soluble in a disperse phase should also be capable of associating with the polymer produced. The foregoing definition of "emulsion" is incorporated as a definition thereof in this specification, and the disclosure of British Pat. No. 1,211,532 is to be understood as being incorporated herein by reference.

We have now found that the process of application Ser. No. 237,522 may be modified or improved by substituting for a reactant insoluble in a specified organic liquid medium, as a liquid disperse phase of an emulsion as defined, a solution of the reaction in another, inert organic liquid in which the reactant is soluble but which is substantially immiscible with the liquid medium of the dispersion.

Thus according to the present invention we provide a process for the preparation of a dispersion of a condensation polymer as hereinbefore defined in a hydrocarbon or chlorinated hydrocarbon liquid medium in which the polymer is insoluble which comprises heating in the said liquid medium, hereinafter referred to as the first liquid, at a temperature of at least 150°C. an appropriate polymer-forming reactant or reactants, the reactant or at least one of the reactants being insoluble in the first liquid and being dissolved in a second liquid which is inert towards the polymer-forming reaction, is substantially immiscible with the first liquid at the temperature of the said reaction and is capable of being separated from the first liquid by distillation, and the solution of the reactant in the second liquid being present as a liquid disperse phase in an emulsion as hereinbefore defined, one of the chain-like components of an emulsifying agent present which is soluble in the said liquid disperse phase being also capable of associating with the polymer produced.

The first liquid, that is to say, the hydrocarbon or chlorinated hydrocarbon liquid medium in which the dispersion of the condensation polymer is finally formed, may be a single liquid in which the polymer is insoluble, or a mixture of two or more liquids which may include minor proportions of liquids in which the polymer is soluble, provided that the polymer is insoluble in the mixture as a whole. The first liquid should have a boiling point which is not lower than the temperature of the polymer-forming reaction.

The second liquid may have a boiling point which is either higher or lower than that of the first liquid. However, when the second liquid has the higher boiling point, it is necessary that it should be capable of forming an azeotrope of boiling point not higher than the boiling point of the first liquid, in order that it may be separated from the first liquid. Such an azeotrope may be formed by the second liquid with the first liquid, or with one component of the first liquid where the latter is a mixture, or it may be formed by the second liquid with the low molecular-weight by-product of the polymer-forming reaction so that both these materials, which are unwanted in the final polymer dispersion, are eliminated together from the reaction mixture. It may be convenient in many cases if an azeotrope containing the second liquid separates into its constituents on standing; this will render recovery of the second liquid easier, which may be desirable if the second liquid is a relatively expensive special solvent selected because of its power to dissolve the polymer-forming reactant.

When the second liquid is not capable of forming an azeotrope either with the first liquid or with the reaction by-product, it is sufficient if the second liquid has a lower boiling point than the first liquid so that it may be separated from the latter by fractional distillation.

If the by-product of the polymer-forming reaction does not form an azeotrope with the second liquid, it is preferred that it should form an azeotrope with the first liquid or a component thereof so as to assist its removal from the reaction mixture.

If desired, the process of the invention may be operated under a superatmospheric pressure as a means of controlling the boiling points of liquids which are otherwise suitable as either the first liquid or the second liquid; in the foregoing discussion, therefore, the references to boiling points and azeotrope formation are to be understood as being applicable to operation under either normal or superatmospheric pressure conditions, as appropriate.

The second liquid may be either a solvent or a non-solvent for the polymer product.

The process of the present-invention is applicable to all normally liquid condensation polymer-forming reactants and to all solid condensation polymer-forming reactants which can be melted so as to be in the liquid form at the temperature of the reaction. It is, however, particularly convenient in the case of reactants which are solid even at the normal temperature of the condensation reaction, but which can be dissolved in an inert liquid which is immiscible with the liquid of the dispersion at the reaction temperature. It is not essential that the reactant should be soluble in the chosen inert liquid at room temperature, but it should be sufficiently soluble therein at the reaction temperature to ensure that no solid phase material remains when reaction commences. The reactant or reactants so treated may be either nonomeric or of a very low degree of polymerisation comprising a small number of repeating units of the type occurring in the final disperse polymer.

Where the polymer-forming reaction involves more than a single reactant which is to be present as an emulsified solution as described above, each such reactant may be dissolved in a different inert liquid which is immiscible with the liquid medium at the reaction temperature. Alternatively, where appropriate, the same inert liquid may be employed for all the reactants in question.

Where two or more polymer-forming reactants insoluble in the liquid medium are involved, and these include a reactant which is liquid at room temperature or can melted so as to be in liquid form at the reaction temperature, such a reactant may if desired be emulsified directly in the liquid medium, according to the procedure described in application Ser. No. 237,522. In addition to a reactant or reactants which are insoluble in the liquid medium, there may also be one or more reactants which are soluble therein.

In some cases it may be convenient for only part of each reactant which is to be present as an emulsified solution to be so emulsified initially, the remainder of the reactant being added as the reaction proceeds. In this way the maintenance of stable emulsions throughout the reaction may be ensured; in contrast, if all the reactant or reactants are present at the commencement of the reaction the resulting alteration in the solvent characteristics of the emulsion particles and/or the liquid medium may interfere with the action of the emulsifying agent.

The addition of further reactants to the preformed emulsified solution is preferably carried out under conditions of rigorous shearing and at such a rate that reaction to give the desired polymer takes place without the emulsion becoming unstable.

A catalyst, for example, an esterification catalyst, may be used to reduce reaction times, especially near to the end of the reaction. Such material may conveniently be incorporated with the insoluble reactant at the emulsification stage.

The characteristics of the emulsifying agent which are necessary for the formation of a stable emulsion of a solution of a reactant are referred to in application Ser. No. 237,522 and are set out in detail in the aforementioned British Pat. No. 1,211,532. According to that patent the emulsifying agent may be a simple block copolymer consisting of two chain-like components, one of each type as described above. In this case the molecular weight of each component must be at least 3,000. The components may be of higher molecular weights, the upper limit being set only by the practical difficulties of making block copolymers containing high molecular weight components. Alternatively, the agent may be a copolymer comprising a polymeric backbone providing one type of component and carrying, as one or more side chains, components of the other type, (a "comb" type copolymer). This type of copolymer may be made by conventional graft polymerisation or by copolymerisation of a monomer, which will form the backbone, with a soluble chain-like component of molecular weight at least 1,000 and preferably at least 1,500 having an ethylenically unsaturated group. Copolymerisation results in attachment of the chain-like component to the backbone. Another alternative is to copolymerise two types of chain-like component, each having an unsaturated group, so as to produce a polymer backbone from which are pendent the two types of chain-like components required in the emulsifying agent (a "double comb" type copolymer). Where there is only one side chain then the backbone provides one component and the side chain the other, both being of molecular weight at least 3,000. Where there are two or more side chains of one type of component their total molecular weight must be at least 3,000 and the average molecular weight of the components of that type must be at least 1,000. Where there are n side chains and n is greater than 3, then the molecular weight of the backbone must be at least $n \times 1,000$, preferably at least $n \times 1,500$. A single emulsifying agent or moe than one such agent may be present as required.

It is also necessary that the emulsifying agent, or at least one of the emulsifying agents if more than one is used, should comprise a chain-like component which is not only soluble and non-self-associated in a reactant disperse phase but is also capable of becoming associated with the condensation polymer product so that the emulsifying agent molecule as a whole becomes anchored to the particles of the polymer and the latter are thereby stabilised as a dispersion in the liquid medium. Such a capability may be introduced, for example, by providing the disperse phase-soluble component of the emulsifying agent with polar groups which can interact with complementary polar groups in the polymer produced. Alternatively, it may be arranged that the disperse phase-soluble component comprises a polymeric chain of the same or similar chemical composition as that of the polymer produced, so that this component becomes entangled in, and hence integrally associated with, the chains of the polymer produced. A preferred procedure is to employ an emulsifying agent which is of a composition satisfying the requirements for formation of a stable reactant emulsion and which also possesses reactive sites on the disperse phase-soluble component which are capable of participating in the condensation polymerisation reaction. For example, the component in question may be provided with carboxylic acid or hydroxyl groups which can take part in condensation reaction between a polyol or a polyamine and a polybasic acid. In this way a polymeric chain of the required characteristics for association with the polymer product is built up during the actual polymerisation.

By process of the invention, stable dispersions of condensation polymers can be obtained in which the disperse particles are of a broad range of sizes. At the one extreme, by gradual addition of a second reactant to an emulsified solution of a first reactant, or by utilizing an emulsifying agent which participates in the polymerisation reaction, as already described, particle sizes as low as $0.1 - 10\mu$ can be achieved.

Typical polymer-forming reactants for use in the present invention include polyacids and reactive derivatives thereof such as anhydrides and acid halides. These may be reacted with polyols to form polyesters or with polyamines to form polyamides.

Examples of suitable polyacids or derivatives thereof include adipic acid, azelaic acid, succinic anhydride, phthalic anhydride, isophthalic acid, terephthalic acid, trimellitic acid, pyromellitic acid, 1:3- and 1:4-cyclohexane dicarboxylic acids and mixtures thereof, as well as inorganic acids such as orthophosphoric acid.

Suitable polyols include ethylene glycol, diethylene glycol, trimethylene glycol, tetramethylene glycol, hexamethylene glycol, tetramethyl ethylene glycol, neopentyl glycol, trimethylol-propane, glycerol, 1:2:6-hexane triol, 1:3- and 1:4-cyclohexane diol and p-xylylene glycol, as well as hydroquinone and other polyhydric phenols.

Suitable polyamines include ethylene diamine, hexamethylene diamine, decamethylene diamine, diethylene triamine, piperazine, p-xylylene diamine, and phenylene diamines.

Other suitable polymer-forming reactants include diaryl carbonates such as diphenyl carbonate, and bisphenols, such as diphenylolpropane, which can react together to form aromatic polycarbonates; also diaryl carbonates and aliphatic or aromatic diamines, such as hexamethylene diamine or p,p'-diaminodiphenyl ether, which can react together to yield aliphatic or aromatic polyureas. Yet a further group of suitable reactants are phenols, such as phenol, p-cresol, the xylenols and o-phenylphenol, and formaldehyde or substances yielding or equivalent to formaldehyde such as paraform or trioxane, which can react together to produce curable phenol-formaldehyde oligomers.

Single polymer-forming reactants may also be employed, such as 11-amino-undecanoic acid for the production of nylon 11, ω-hydroxydecanoic acid for the production of poly(oxydecanoate) and p-acetoxybenzoic acid for the production of poly(p-oxybenzoate). Preformed reaction products of a polyacid and a polyol or a polyamine may also be used as a single polymer-forming reactant, e.g. bis(hydroxy-ethyl) terephthalate or hexamethylene diammonium adipate (nylon 66 salt).

Hydrocarbon liquids which are useful in the process of the invention as the first liquid are aliphatic and aromatic hydrocarbons, for example hexane, heptane, octane, cyclohexane, benzene, toluene, xylene and mesitylene, and mixtures of these including commercially available petroleum distillate fractions having boiling ranges up to about 250°C. and containing up to about 90% of aromatic hydrocarbons. Suitable chlorinated hydrocarbons for use as the first liquid include carbon tetrachloride, tetrachlorethane, pentachlorethane, chlorobenzene, dichlorobenzene and trichlorobenzene.

Having regard to the generally polar character of reactants suitable for forming condensation polymers, the second liquid used in the process of the invention, which is required to be a solvent for such a reactant, will usually be a polar liquid. Where the first liquid is an aliphatic hydrocarbon, or a predominantly aliphatic hydrocarbon mixture, suitable polar second liquids include lower alcohols and glycols, such as methanol, ethylene glycol, butane diol, xylylene glycol, propylene glycol, butane triol, trimethylolpropane, cyclohexane diol, triethanolamine, formamide, dimethyl-formamide, and monohydric phenols and their substituted derivatives. Where the first liquid is an aromatic hydrocarbon mixture or is a chlorinated hydrocarbon, suitable polar second liquids include water and lower glycols such as ethylene glycol and propylene glycol.

It will be understood from the description above that the emulsifying agent functions by virtue of its having one polymeric component which is soluble in the hydrocarbon of chlorinated hydrocarbon liquid, which constitutes the first liquid or continuous phase of the emulsion as hereinbefore defined, and another polymeric component which is soluble in the solution of the reactant in the second liquid, which constitutes the disperse phase of the emulsion. These two types of component are combined in a single molecule, and each component is chosen in accordance with the principles set out in British Pat. No. 1,211,532.

The chain-like component of the emulsifying agent which is to be soluble in the hydrocarbon or chlorinated hydrocarbon medium will in general be a polymer chain of relatively low polarity. Thus appropriate components for use in conjunction with aliphatic hydrocarbons include:

polymers of long chain esters of unsaturated acids, e.g. stearyl, lauryl, octyl, 2-ethyl hexyl, hexyl and butyl esters of acrylic and methacrylic acids;

polymers of vinyl esters of long chain acids, e.g. vinyl esters of long chain acids, e.g. vinyl stearate and vinyl esters of branches tertiary carboxylic acids such as those sold under the registered trade mark 'Versatic' acid;

polymeric vinyl alkyl ethers of poly-alkylene oxides, e.g. polyproplene oxide of molecular weight 1,000–3,000;

polymers of butadiene and isoprene and non-crystalline polymers of ethylene and propylene;

self-polyesters (of molecular weight greater than 1,000) of hydroxy fatty acids, e.g. 12-OH stearic acid, hydrogenated castor oil fatty acids and the hydroxy acids of carnauba wax;

polyesters of di-acids with diols, e.g. polyesters of sebacic acid with 1,12-dodecane diol or of adipic acid with neo-pentyl glycol.

Where the first liquid is mainly aromatic hydrocarbon or chlorinated hydrocarbon in nature, the above types of soluble components may again be used and, in addition, shorter chain analogues, e.g. polymers of ethoxyethyl methacrylate, methyl methacrylate and ethyl acrylate, as well as aromatic polyesters, such as non-drying oil-modified alkyd resins and polymers of styrene, vinyl toluene and tert-butyl styrene.

The chain-like component of the emulsifying agent which is to be soluble in the solution of the reactant in the second liquid will in general be a polymer chain of higher polarity than the component first described. Where the second liquid is water or a lower alcohol or glycol, for example, the chain-like component may be one of the following:

polyethylene oxide condensates, either hydroxyl-terminated or methoxyl-terminated;

polymers of vinyl pyrrolidone and copolymers thereof;

polymers containing dimethylaminoethyl methacrylate or diethyl aminoethyl methacrylate as the salt, e.g. the hydrochloride, if desired;

polymers containing methacrylamide or acrylamide;

polymers containing substantial quantities of carboxyl group, e.g. polymers containing methacrylic acid or itaconic acid, either as the free acid or solubilised by means of a change in pH of the solution, i.e. formation of the sodium, potassium, ammonium or organic amine salt.

The requirement that the emulsifying agent used in the process of the present invention should comprise a chain-like component which is both soluble in the solution of the reactant in the second liquid and capable of becoming associated with the condensation polymer produced may call for the presence in the molecule of the emulsifying agent of a third type of component additional to the two types of component which have just been discussed, such third type of component functioning in one or more of the ways mentioned previously. However, in many cases it can be arranged that the component which is soluble in the reactant disperse phase inherently possesses this "anchoring" ability. Indeed, it is probable that any such soluble polymeric component will provide some degree of anchoring simply by virtue of the fact that it is present in a chain-extended state in the disperse liquid particles in which the polymerisation reaction is taking place; as a result, physical chain entanglement will occur of this component with the newly-formed condensation polymer molecules. It is preferred, however, that the component in question should contain some reactive grouping which enables it to participate in the condensation polymerisation reaction as already described.

The proportion of emulsifying agent required will usually range from 1–10% by weight of the disperse phase that is to say, the solution of the reactant in the second liquid. In general the corresponding particle size of the disperse phase will be of the order of $2-0.1\mu$ dependent on the proportion of agent used and for particularly fine emulsions it is preferred to use emulsifying agent in a proportion of from 5–10% by weight of the disperse phase which will produce particle sizes in the range $0.5-0.1\mu$.

The relative proportions of the first and second liquids employed, and the concentration of the reactant in the second liquid, may vary widely. In most cases, however, the disperse phase, i.e. the solution of the reactant in the second liquid, will constitute from 10% to 75% by volume of the total reaction composition (disperse phase plus continuous phase). The concentration of the reactant dissolved in the second liquid will usually range from 10% to 90% by weight; the maximum attainable concentration may be limited by the need to keep the viscosity of the solution sufficiently low to permit its efficient emulsification in the first liquid.

The process of the invention may be operated in a number of different ways depending upon the characteristics of the first and second liquids. In the simplest case, the second liquid forms an azeotrope with the reaction by-product and this azeotrope has a boiling point below that of the first liquid so that it is continuously removed from the mixture as the reaction proceeds. However, in order to ensure that the polymer-forming reaction goes to completion it may be necessary to delay the removal of the second liquid from the reaction mixture until all the by-product has been removed. In such a case, the second liquid should be relatively high-boiling and the by-product should form an azeotrope with the first liquid rather than with the second liquid, or preferably with a lower-boiling component of the first liquid. After the by-product has been eliminated, any remaining low-boiling component of the first liquid is distilled off and the second liquid is then separated from the first liquid (or its higher-boiling component) by fractional distillation.

It follows from the foregoing description that the condensation polymer may be formed directly as particles dispersed in the first liquid, or they may be formed initially as particles dispersed in the second liquid which in turn is emulsified in the first liquid, and subsequently becoming dispersed directly in the first liquid after the second liquid is removed. The condensation polymer may yet again be formed initially in solution in the second liquid which is emulsified in the first liquid and brought into a stage of dispersion in the latter as the second liquid is subsequently removed. However, in every case the polymer particles (irrespective of the stage at which they are formed) are stabilised by association with them of a chain-like component of an emulsifying agent present which is soluble in the liquid disperse phase of the original emulsion.

As already indicated, the present process is particularly suitable for the production of dispersions of condensation polymers for polymer-forming reactants which are solid even at the temperature of reaction, but it may also be advantageous in the case of reactants which can be melted at temperatures below the reaction temperature in affording dispersions of finer particle size than are obtainable by the process of application Ser. No. 237,522 where the molten reactant is directly emulsified in the liquid dispersion medium.

In certain cases, the optimum reaction temperature for the process may lie above the softening point of the polymer formed. It may be necessary to use a rather higher proportion of the emulsifying/dispersing agent than would otherwise be the case (following the directions given in application Ser. No. 8164/71 and in British Pat. No. 1,211,532), in order to maintain stability of the polymer dispersion as it is cooled to ordinary temperatures. A simpler procedure is to use the normal proportion of emulsifying/dispersing agent but to cool the dispersion very rapidly from the reaction temperature down to below 60°C. by passing it through a heat exchanger; loss of stability is then avoided. This difficulty does not arise, however, when the emulsifying agent used contains in the disperse phase-soluble component groupings which can take part in the condensation polymerisation reaction, as in the preferred procedure described above.

Dispersions obtained by the process of the invention are of value for the production of coatings upon such substrates as glass fibre and textile materials; where the disperse polymer is capable of undergoing a subsequent cross-linking reaction, as for example in the case of a phenol-formaldehyde oligomer, the substrate to which the polymer has been applied may be subjected to a curing step. Alternatively, the dispersions may be converted into polymer powders by evaporation of the continuous phase liquid or by filtration, decantation or centrifugation, depending on the particle size of the disperse phase. The powders obtained may be used, for example, in the manufacture of moulded articles or of fibres.

The invention is illustrated but not limited by the following Examples, in which parts are by weight:

PREPARATION A

Preparation of a "comb" type graft copolymer emulsifying agent having side chains of poly(12-hydroxystearic acid) grafted to a poly(methyl methacrylate) backbone A 2-liter reaction vessel is equipped with a mechanical stirrer, a thermometer, a reflux condenser, a nitrogen inlet tube and a provision of metering directly into the charge a feed comprising of 218 parts of methyl methacrylate, 6.6 parts of azodiisobutyronitrile and 38 parts of a 49.7% solution, in aliphatic hydrocarbon, of poly(12-hydroxystearic) acid of mol. wt. 1500 – 2000 which has been reacted with glycidyl methacrylate to introduce a terminal methacrylate group. The vessel is charged with 305 parts of xylene and heat is applied to bring the xylene to reflux at 144°C. under an atmosphere of nitrogen. The feed is then metered into the xylene over a period of 3 hours. After 3 more hours under reflux 1 part of azodiisobutyronitrile is added and refluxing continued for a further 4 hours. The final solids content of the graft copolymer solution obtained is 42.4%.

PREPARATION B

Preparation of a "double comb" type graft copolymer emulsifying agent having side chains of poly(12-hydroxystearic acid and of poly(ethylene glycol) respectively grafted to a poly(methyl methacrylate) backbone A 10-liter reaction vessel is equipped with a mechanical stirrer, a thermometer, a reflux condenser and a nitrogen inlet tube. To the vessel is charged 885 parts of a 56.5% solution in toluene of methoxypoly-(ethylene glycol) of mol. wt. 750 which has been reacted with glycidyl methacrylate to introduce a terminal methacrylate group, 2000 parts of a 50.0% solution in aliphatic hydrocarbon of poly(12-hydroxystearic) acid of mol. wt. 1500 – 2000 which has been reacted with glycidyl methacrylate to introduce a terminal methacrylate group, 500 parts of methyl methacrylate, 20 parts of azodiisobutyronitrile, 20 parts of primary octyl mercaptan and 500 parts of toluene. An atmosphere of nitrogen is introduced into the reaction vessel, heat is applied to bring the charge to reflux at 98°C., and refluxing is then continued for 7 hours. After this time 2 parts of azodiisobutyronitrile are added and the refluxing is continued for 4 hours more. The final solids content of the graft copolymer solution obtained is 40.1%.

EXAMPLE 1

A 2-liter reaction vessel is equipped with a mechanical stirrer, a mechanical emulsifier, a Dean and Stark condenser, a thermometer, a nitrogen inlet tube, and a provision for metering a monomer feed directly into the charge.

To the vessel is charged 231 parts of adipic acid, 500 parts of an aliphatic hydrocarbon, boiling range 170° – 210°C., and 49 parts of the 42.4% solution of emulsifying agent obtained in Preparation A. An atomosphere of nitrogen is introduced into the vessel and the charge is heated up with the stirrer and emulsifier both in operation. At 150°C an emulsion of molten acid in the aliphatic hydrocarbon is formed. Refluxing commences at 183°C. and is continued for 20 minutes to ensure good emulsion formation. A feed of 183 parts of hexamethylene diamine dissolved in 112 parts of water is metered into the refluxing charge over a period of 3 hours. The water from the feed together with the water of reaction azeotrope with the aliphatic hydrocarbon and are separated off in the Dean and Stark condenser. At the end of the feed only 6 parts of water remain in the charge. The charge is refluxed for a further 3 hours. A stable dispersion is obtained of Nylon 6.6 having a particle size range of $0.2 - 4.0\mu$. The number average molecular weight ($\overline{M}n$) of the polymer is 2,300.

EXAMPLE 2

Preparation of non-aqueous dispersion of Nylon 6.6 from Nylon 6.6 salt

A 2-liter reaction vessel is equipped with a mechanical stirrer, a mechanical emulsifier, a thermometer, a Dean and Stark condenser and a nitrogen inlet tube.

The vessel is charged with 180 parts of Nylon 6.6 salt, 540 parts of ethylene glycol, 540 parts of an aliphatic hydrocarbon, boiling range 170° – 210°C., and 22 parts of the solution of "double comb" emulsifying agent obtained in Preparation B. An atmosphere of nitrogen is introduced and heat is applied to the charge with the stirrer and emulsifier both in operation. The Nylon 6.6 salt dissolves in the ethylene glycol and this salt solution emulsifies in the aliphatic hydrocarbon. Refluxing commences at 166°C. and the ethylene glycol together with the water of reaction azeotrope with the aliphatic hydrocarbon and are separated off in the Dean and Stark condenser. After 4 hours 563gms. of ethylene glycol and water are removed (the theoretical amount is 565gms.) and the emulsifier is turned off. Stirring and refluxing are continued for a further 2 hours, during which time the remaining 2gms. of ethylene glycol and water are removed. A stable dispersion of Nylon 6.6 is obtained, the particle size range being $0.5 - 4.0\mu$.

EXAMPLE 3

Preparation of Nylon-11 in dispersion from 11-amino undecanoic acid

A reaction vessel is equipped as in Example 2 and is charged with 330 parts of 11-aminoundecanoic acid, 500 parts of ethylene glycol, 500 parts of aliphatic hydrocarbon, boiling range 150° – 200°C., and 38 parts of the solution of "double comb" emulsifying agent obtained in Preparation B. An atmosphere of nitrogen is introduced and heat is applied to the charge with both the emulsifier and stirrer in operation. The solution of 11-aminoundecanoic acid in ethylene glycol initially formed becomes emulsified in the aliphatic hydrocarbon. Refluxing commences at 151°C., when ethylene glycol and water of reaction azeotrope off with the aliphatic hydrocarbon and are separated off in the Dean and Stark condenser. All the ethylene glycol and water are removed after 4 hours and refluxing is then continued for a further 2 hours. A stable dispersion of Nylon 11 is prepared having a particle size range of $1 - 5\mu$.

EXAMPLE 4

Preparation of dispersion of poly(ethylene terephthalate)

| | |
|---|---|
| Dimethyl terephthalate | 500 parts |
| Ethylene glycol | 1,000 parts |
| Calcium acetate | 0.1 part |
| Aliphatic hydrocarbon (boiling range 230 – 250°C.) | 1,000 parts |

-continued

| Graft emulsifying agent of Preparation B (40.1% solution) | 60 parts |

The above reactants were heated at 180°C. with rapid stirring in the presence of a mechanical emulsifier until a fine emulsion was obtained. The temperature was raised to reflux and the excess ethylene glycol and methyl alcohol from the ester interchange reaction were removed by azeotropic distillation while the internal temperature rose to 230°C. Distillation was maintained at this temperature until all the glycol had been removed, leaving a 30% dispersion of poly(ethylene terephthalate) with particle size in the range 3 – 5μ.

EXAMPLE 5

To a 4 liter reactor fitted with a dip leg, emulsifier head, stirrer, distillation column and temperature recorder are charged:

| | |
|---|---|
| 11-Aminoundecanoic acid | 225 parts |
| Ethylene glycol | 675 parts |
| O-Dichlorobenzene | 900 parts |
| AB-Block copolymer dispersant (see below) | 20 parts |

The mass is stirred under a stream of nitrogen for ½ hour to free the reactants from oxygen. The reaction mass is heated slowly till the acid dissolves in the ethylene glycol (at about 140°C). The emulsifying head is then started and operated at 3,000 rpm. This emulsifies the solution of the acid in the dichlorobenzene. With the emulsifier running, the reaction mixture is heated to boiling point and the azeotrope of ethylene glycol and dichlorobenzene is separated in a reverse separator, the dichlorobenzene being returned to the reactor and the ethylene glycol/water layer being removed. When all the by-product has been removed (about 3 hours), the dispersion so obtained is blown from the reaction vessel by inert gas through the dip leg on to a metal coil in a separate vessel, the metal coil being cooled by the passage of cooling water. The resulting cold dispersion of poly(undecanoamide), having a particle size range of 0.2 – 2μ and a solids content of 22% by weight is stable to flocculation.

The polymer dispersion is useful for the coating of copper wire with nylon-11. The dispersant used in this Example is an AB-type block copolymer made by reacting a self-condensate of 12-hydroxystearic acid (from castor oil fatty acid containing 15% stearic acid), having $\overline{M}n$ 1500–2000, in the molten state with an equal weight of ethylene oxide.

EXAMPLE 6

The procedure of Example 5 is repeated, using instead of the dispersant there described an equal weight of an AB-type block copolymer made by reacting a carboxyl group-terminated poly-butadiene of molecular weight 2010 (Product C-2000 from Hystl Development Co.) with an equal weight of ethylene oxide. A similar dispersion to that described in Example 5 is obtained.

EXAMPLE 7

The procedure of Example 5 is repeated, using instead of the dispersant there described an equal weight of an AB-type block copolymer made by reacting a hydroxyl group-terminated polybutadiene of molecular weight 4000–5000 (commercially known as ARCO R4SM) with an equal weight of ethylene oxide. A similar dispersion to that described in Example 5 is obtained.

EXAMPLE 8

The procedure of Example 5 is repeated, using instead of the dispersant there described an equal weight of an AB-type block copolymer of tert-butylstyrene and ethylene oxide, each block having a molecular weight of about 3000, made by the anionic polymerisation technique described in Trans. Farad. Soc., 55, 1967 (1959). A similar dispersion to that described in Example 5 is obtained.

EXAMPLE 9

| | |
|---|---|
| Phenol | 300g |
| p-Cresol | 780g |
| 30% Formalin | 1100g |
| Dispersing agent as described in Example 5 (5% on polymer weight) | 59g |
| Hydrocarbon, boiling range 150 – 180°C | 1500g |
| Sodium Carbonate | 6g |

The phenol, cresol, formalin, dispersant and hydrocarbon are stirred rapidly whilst being heated to 100°C. An emulsion of the reactants in the hydrocarbon is formed, of droplet size in the range 4 – 10μ. The sodium carbonate is then added and the reaction mixture held at 100°C for 2 hours, water being removed by azeotropic distillation. A fine, 44% solids dispersion of the phenol/cresol-formaldehyde oligomer, containing reactive methyol groups, in the hydrocarbon is obtained. The particle size is in the range 2 – 5μ. The hydrocarbon is removed by evaporation from a portion of the dispersion; the resulting fine powder is blended with an acid catalyst such as dodecyl sulphonic acid and used to impregnate glass fibre mats which are then cured by heating to 130°C/1 hour.

EXAMPLE 10

To a 4-liter reactor fitted with a stirrer and emulsifier, temperature recorder, a cooled Dean and Stark separator and a dip leg are charged:

| | |
|---|---|
| Diphenyl carbonate | 428g |
| Diphenylol propane | 456g |
| Phenol | 500g |
| Aliphatic hydrocarbon (boiling range 180 – 200°C) | 1000g |
| AB Block copolymer dispersant as described in Example 8 | 100g |

The reaction mixture is heated with stirring under N₂ stream. The diphenyl carbonate and diphenol propane dissolve in the molten phenol. The emulsifier is turned on slowly to avoid frothing to 3,000 rpm and gives a fine dispersion of the phenol solution in the aliphatic hydrocarbon. The dispersion is heated to boiling and the distillate of hydrocarbon and phenol is separated azeotropically. The distillation is continued until no mor phenol is distilled. A dispersion of the polycarbonate of particle size about 1μ and 33.7% solids is obtained.

EXAMPLE 11

The procedure of Example 10 is repeated, but replacing the diphenylol propane by 400g of p;p'-diamino diphenyl ether.

Removal of the phenol by azeotropic distillation yields a dispersion of poly(p;p'-diphenyl ether urea).

What we claim is:

1. A process for the preparation of a dispersion of a condensation polymer, in which the links between the reactants forming the polymer chain involve atoms other than carbon and in the formation of which a low molecular weight by-product is eliminated, in a first liquid medium selected from the group consisting of hydrocarbons and chlorinated hydrocarbons in which the polymer is insoluble, the process comprising heating in the said first liquid medium, at a temperature of at least 150°C, an appropriate polymer-forming reactant or reactants, said first liquid having a boiling point not lower than the temperature at which the polymer is formed and the reactant or at least one of the reactants being insoluble therein, each said insoluble reactant being dissolved at a concentration of from 10% to 90% by weight in a second liquid which is inert towards the polymer-forming reaction, is substantially immiscible with the first liquid at the temperature of the said reaction and is capable of being separated from the first liquid by distillation, and the solution of the reactant in the second liquid being present as the liquid disperse phase of an emulsion of which the continuous phase is the first liquid, the polymerization taking place in the disperse phase which constitutes from 10% to 75% by volume of the total emulsion, and wherein there is present, in an amount of from 1% to 10% by weight of the said disperse phase, an emulsifying agent which has at least one polymeric component soluble in the said continuous phase and at least one other polymeric component soluble in the said disperse phase, one of the polymeric components of the emulsifying agent which is soluble in the said disperse phase being also capable of sufficient association with the polymer produced for the preparation of a stable, finely divided polymer dispersion.

2. A process as claimed in claim 1, wherein any reactant which is insoluble in the first liquid is, in the absence of the second liquid, solid at the temperature of the condensation reaction.

3. A process as claimed in claim 1, wherein there is present in addition a reactant which is liquid at the temperature of the condensation reaction and is emulsified directly in the first liquid.

4. A process as claimed in claim 1, wherein there is also present a reactant which is soluble in the first liquid.

5. A process as claimed in claim 1, wherein the emulsifying agent possesses reactive sites on the disperse phase-soluble component which are capable of participating in the condensation polymerisation reaction.

6. A process as claimed in claim 1, wherein the emulsifying agent is a simple block copolymer consisting of two chain-like components.

7. A process as claimed in claim 1, wherein the emulsifying agent is a copolymer comprising a polymeric backbone providing one type of component and carrying, as one or more side-chains, components of the other type.

8. A process as claimed in claim 1, wherein the emulsifying agent comprises a polymeric backbone from which are pendant side-chains providing the two types of chain-like components required.

9. A process as claimed in claim 1, wherein the polymer-forming reactant or reactants are such that a dispersion of a polyester is formed.

10. A process as claimed in claim 1, wherein the polymer-forming reactant or reactants are such that a dispersion of a polyamide is formed.

* * * * *